Feb. 6, 1940.　　　　L. ÜRMÉNYI　　　　2,189,092
APPARATUS FOR MEASURING THE THICKNESS OF FOILS
Filed Aug. 17, 1936　　2 Sheets-Sheet 2
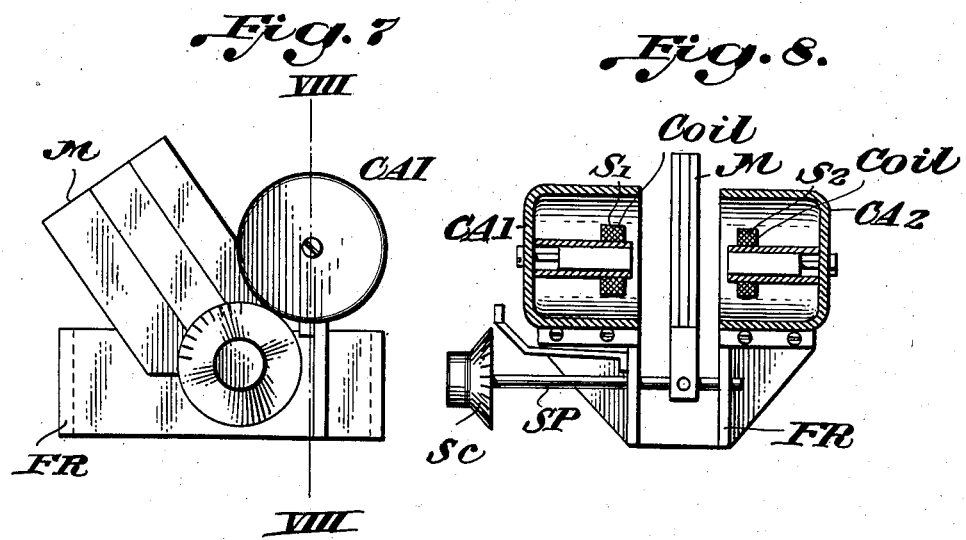
Inventor:
Ladislaus Urmenyi
By Glascock Downing & Seebold
attys.

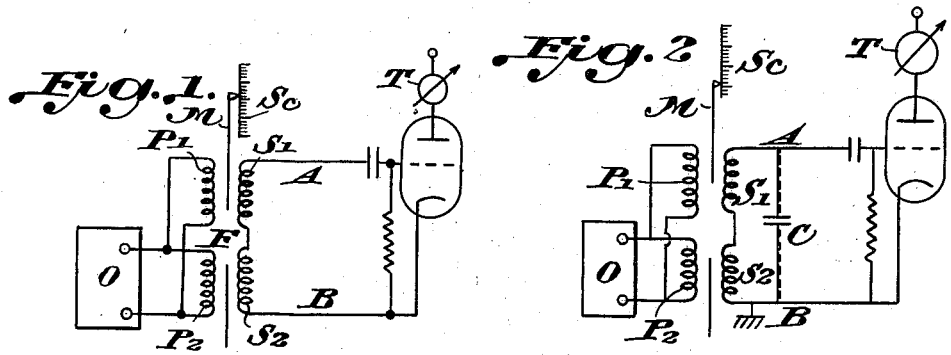
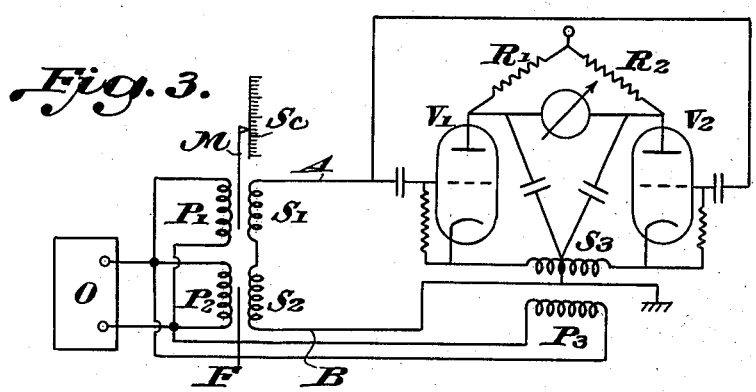
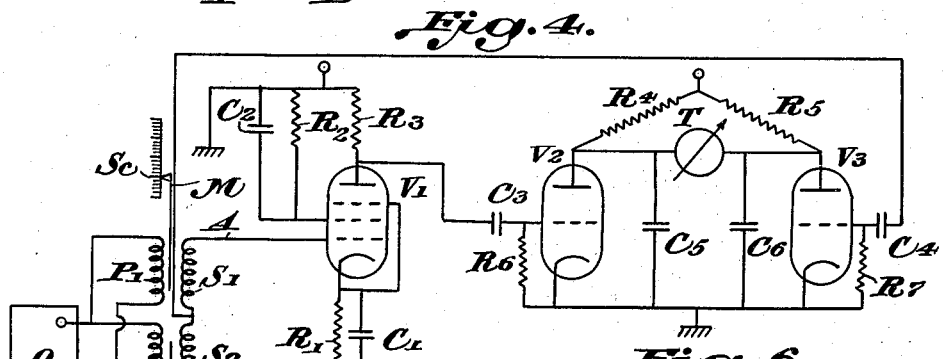
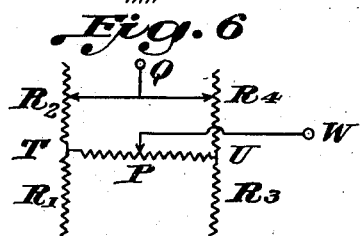

Patented Feb. 6, 1940

2,189,092

UNITED STATES PATENT OFFICE 2,189,092

APPARATUS FOR MEASURING THE THICKNESS OF FOILS

Ladislaus Ürményi, Bern, Switzerland

Application August 17, 1936, Serial No. 96,399½
In Switzerland June 28, 1935

6 Claims. (Cl. 175—183)

This invention relates to a device for measuring the thickness of foils.

It has already been proposed to measure the thickness of metal foils in such manner that the foil will be brought between two coils, of which the primary one carries alternating current, whereby the voltage induced in the secondary coil will be affected by the eddy currents which are excited in the foil which is pushed in. This influence is dependent upon the specific electrical conductivity, upon the magnetic permeability and upon the thickness of the foil to be measured. Should foils of various thicknesses but of the same material be introduced between both coils, then the influence of the secondary voltage is dependent only upon the thickness of the foil. The secondary voltage is a measure for the thickness of the foil. This method is too little sensitive especially for an extensive range of measurement, and the measurement will be very strongly influenced by variations in the frequency and amplitude of voltage of the alternating current flowing through the primary coil.

There are also methods known, by which two pairs of coils are used in such a manner, that the both primary coils are carrying alternating current, the foil to be measured is brought between the coils of the one pair of coils, whereby the secondary voltage will be affected, the two secondary voltages will be each separately rectified and the so obtained direct voltages will be compared. These methods have the fault, that the calibration is dependent of the characteristics of the tubes used and because the characteristics of the tubes in time changes and also because the tubes must be exchanged in time, such an apparatus can not be calibrated. Another fault of these methods is, that the measured voltage is different with different thicknesses of foils, i. e., the whole range of measuring is spread over the characteristic of one tube, whereby the ratio of the range to the sensitivity is limited. For a favourable sensitivity one must choose a small range and for a greater range the sensitivity is reduced.

The present invention is free of all these faults and consists in that the voltage measured or compared is kept constant over the whole range of measuring, i. e., the tubes are always working at the same point of the characteristics, whereby a large range and a high degree of sensitivity may be obtained simultaneously and the measurement is independent of the characteristics and therefore also of the changes of the characteristics of the tubes and consequently the apparatus may be calibrated absolutely. Two pairs of coils are used of which the primary coils are carrying alternating current, the foil to be measured will be brought between one pair of coils, and the coils are connected, and by means of a regulating member described in the examples, coupled in such a manner that both the voltages of the secondary coils connected in series, are approximately opposite in phase and equal in amplitude or produce a constant difference of amplitude and therefore the secondary voltage affected by the foil to be measured is not measured or compared, but the difference of both of the secondary voltages—which difference may have also the value of zero—kept constant in the said manner will be measured or compared with a constant comparison voltage.

The said regulating member is connected to a scale, which may be calibrated in foil thickness.

The apparatus may be used chiefly for the following purposes:

1. Measuring the thickness of metal foil and sheet metal. If the foil is placed in the apparatus, the scale is then turned until the hand of the indicator instrument takes a quite definite position, and afterwards the thickness of the foil may be read on the scale.

2. Observation of deviation from previously determined thickness. Because the foil to be measured does not touch any part of the apparatus, it is possible to measure or observe the thickness of moving foil. This is important, if in the rolling mill a foil with previously fixed thickness is to be manufactured and this thickness is to be kept constant during the manufacture. For this purpose the calibrated scale is adjusted to the required thickness, the foil is led during the manufacture from the mill through the apparatus and the deviations from the required thickness may be read on the indicator instrument. When deviation appears, the rolling mill may be adjusted and the fault corrected immediately.

Several embodiments of the invention are illustrated by way of example in the accompanying drawings, in which:

Fig. 1 is a simple working example of the invention.

Fig. 2 shows a variation thereof.

Fig. 3 is a working example, in which the cathodes of both tubes connected to a bridge receive alternating voltages.

Fig. 4 is a working example of the invention, in which a bridge connection is used.

Fig. 5 is an example of a circuit used for compensating the influence of temperature.

Fig. 6 is another example of a circuit for compensating the influence of temperature.

Fig. 7 is an elevational view of apparatus for adjusting the phase angle.

Fig. 8 is a sectional view of the apparatus taken on the line VIII—VIII of Fig. 7.

Fig. 9 is a sectional view of one type of the plate showing the unequal thickness thereof.

Fig. 10 is a sectional view of another form of the plate having unequal thickness portions.

Similar reference characters have been utilized to denote like parts in all of the figures.

In Figure 1, $o$ is an oscillator feeding the coils $P_1$, $P_2$, which are connected in parallel, but may also be connected in series. This holds true also of the working examples according to Figures 2, 3 and 4. The circuit of the oscillator is unimportant, any circuit may be used. The circuit of the oscillator is therefore not shown in the drawings. The alternating voltage supplied from the oscillator may be amplified, if needed. Both secondary coils $S_1$ and $S_2$ are connected in series and poled in such a manner, that between both points A and B the difference of both part voltages of the coils $S_1$ and $S_2$ appears. Should it be seen to that—through symmetrical composition—both part voltages are alike in amplitude and phase, then the voltage between A and B is zero. Should, for example, the foil to be measured now be pushed between the coils $P_2$ and $S_2$, then the voltage in $S_2$ alters and thus also at the points A and B. Should a piece of metal plate M be gradually shifted in between both coils $S_1$ and $P_1$, or the piece of metal plate be fixed on to an axle in a movable manner and gradually turned in between the coils, then at a very definite position of the metal plate the voltage induced in coil $S_1$ will be reduced to the same amplitude as the voltage in $S_2$. The position of the plate M is readable on a scale SC. Regarding the amplitude of the voltage in $S_1$ it is immaterial whether a thick piece of metal plate is pushed in only a little between the coils or a thin one a bit further in, but not so as regards the phase. The phase is also dependent upon whether the metal plate is brought symmetrically between both coils or a bit nearer to $P_1$ or nearer to $S_1$. There is for each metal plate thickness quite a definite position between the coils $P_1$ and $S_1$ at which the voltage induced in $S_1$ corresponds in amplitude as well as in phase with the voltage which is induced in $S_2$ after bringing in the foil to be measured between the coils $P_2$ and $S_2$. The phase of the voltage in $S_1$ will also alter when the coils $P_1$ and $S_1$ are brought nearer to one another and simultaneously the metal plate is pushed in deeper between the coils or vice-versa. A suitably cut-out piece of metal plate (possibly which is finally made unequally thick at various places and is possibly also bent) can be so moved on a correspondingly adapted line or so turned on an axle, that every foil thickness which is passed between the coils $P_2$ and $S_2$ corresponds to a position of the metal plate at which the voltage in $S_1$ corresponds in amplitude and phase to that in $S_2$, so that no alternating voltage exists between A and B. With the motion of the metal plate can also be combined a movement of both coils $P_1$ and $S_1$ towards one another. Should the position of the metal plate be shown on a scale, then this scale can be calibrated for the thickness of the foil.

An arrangement for adjusting the position of the metal plate having an unequal thickness is shown in Figs. 7 and 8 wherein the coils $S_1$ and $S_2$ are mounted within cup-shaped screening members $CA_1$ and $CA_2$. These screening members are mounted on a frame FR and the metal plate M having unequal thicknesses as shown in Fig. 9 or 10 is moved between the coils by means of a shaft SP suitably connected to the metal plate. The scale SC may also be arranged on the knob for turning the shaft SP. To observe, whether between the points A and B an alternating voltage exists or not, a tube V connected as a grid leak detector in the figure, is provided, the anode current of which will be measured by the instrument J. Instead of a grid leak detector any other rectifier connection may be used, e. g., biased detector, diode connection etc., which may also be employed in all other examples. The alternating voltage between A and B may be amplified, by one or more stages and after amplification led to the rectifier.

By this method the milliamperemeter J in the anode circuit of the grid leak detector shows a maximum deflection, when the foil has a thickness corresponding to that at which the scale is regulated. If the foil is thicker or thinner then the deflection is slighter. Therefore, it can not yet be decided only from reading the instrument alone, whether a foil is thicker or thinner than what the scale shows, but much more must one look for the position of the maximum deflection by turning the scale to and fro.

The coupling between the coils can be made a little unsymmetrical from the very outset, so that there results an alternating voltage between the points A and B. By inserting the foil to be measured between the coils $P_2$ and $S_2$ this alternating voltage will be changed. Now the metal plate will be shifted in or turned so far between the coils $P_1$ and $S_1$, until the original voltage again appears at the points A and B. By this method the instrument shows an average deflection if the scale points out the correct thickness of the foil. Should the foil be thicker then the pointer will, for instance, deflect more than before, should it be thinner then the pointer will deflect less. From the position of the instrument it can immediately be told whether the foil is as thick as, thicker than or thinner than the thickness at which the scale is adjusted. This is important if the foil-thickness is to be controlled in rolling mills while the foil is revolving on the running band and deviations from the fixed thickness are to be corrected. With this method it is only necessary to take care that at any foil thickness measured the same voltage $e$ always appears between the points A and B. This will be again attained through suitable choice of the coupling between the metal plate M and the coils $P_1$—$S_1$ and therefore the position of the metal plate may be calibrated for the thickness of the foils. If now another primary voltage is chosen, then the voltage between the points A and B will change in the same ratio and takes the value $e'$. If various foils are pushed in between the coils $P_2$—$S_2$, and the coupling between M, $P_1$ and $S_1$ is taken as required from the calibration for the corresponding thickness, then between the points A and B the voltage $e'$ always appears. The calibration is not changed, it is independent of primary amplitude and small variations of frequency. It is also independent of tube characteristics. It is only required that during the measurement the amplitude and the characteristics of the tubes do not change, which is not difficult to realise.

The sensitivity may be increased by forming a resonant circuit of $S_1$, $S_2$ and a condenser C (as shown in Fig. 2). This circuit is tuned to resonate with the current in $P_1$ and $P_2$. If the voltages across $S_1$ and $S_2$ are equal, then the voltage $e$ is zero and the resonant circuit does not become excited; but as soon as the voltage $e$ takes a finite value, the resonant circuit becomes excited and the voltage $e$ builds up to a much larger value. Should the voltage $e$ become too large, the resonant circuit may be damped by a resistance not shown. The condenser C and said resistance may also be employed for the same purpose and function in the examples shown in Figures 3 and 4.

Figure 3 shows a further working example. Here three pairs of coils are used. The three primary coils $P_1$, $P_2$, $P_3$ can be connected again in parallel or in series. The secondary coils $S_1$ and $S_2$ are connected again in series. The secondary coil $S_3$ is earthed in the middle, and both ends lead to the cathodes of the tubes $V_1$ and $V_2$. The alternating voltage, which the cathode of the tube $V_1$ receives, is as high in amplitude as but exactly opposite in phase to the alternating voltage at the cathode of the tube $V_2$. Should the alternating voltage between A and B be zero, then the anode currents of both tubes $V_1$ and $V_2$ are equally big and the instrument J carries no current. This is the case, if the voltage in $S_2$ influenced by the foil F to be measured and the voltage in $S_1$ influenced by the metal plate M are equal in amplitude and phase. Should a thicker foil be taken, then there arises an alternating voltage between A and B, which has, for instance, the same phase as the voltage at the cathode of the tube $V_1$ and the opposite phase to the voltage at the cathode of the tube $V_2$. Thus the alternating voltage between the grid and cathode of tube $V_1$ will become smaller, and that between grid and cathode of the tube $V_2$ will become greater than before. The instrument J shows a deflection. Should, however, a thinner foil be taken, then there arises an alternating voltage between A and B, which has the same phase as the voltage at the cathode of the tube $V_2$. The instrument then deflects in the opposite direction.

Also in this example the voltage between A and B can be amplified by an amplifier.

Fig. 4 shows another working example of the invention. The left part of the circuit, including O, $P_1$, $P_2$, $S_1$, $S_2$, M is connected in the same manner as in Fig. 1. In Fig. 4 the voltage between A and B is amplified by means of a tube $V_1$. In the drawings a high frequency pentode is used as amplifier in the usual manner but any other type of tube may be used and if only a small sensitivity is required, the amplification may be omitted. The fall of voltage across the resistance $R_1$ supplies the grid bias; $R_2$ is a series resistance supplying the screen-grid-voltage; $R_3$ is the anode-load; $C_1$ and $C_2$ are by-pass condensers. The tubes $V_2$ and $V_3$ are connected as grid-leak detectors, they may also be connected as biased detectors, or any other form of rectification may be used. The tubes $V_2$ and $V_3$ with the resistances $R_4$ and $R_5$ are connected in a bridge circuit, the instrument J is used as a zero indicator. $C_5$ and $C_6$ are by-pass condensers, $C_3$ and $C_4$ are grid condensers, $R_6$ and $R_7$ are grid resistances.

The working of the coils $P_1$, $P_2$, $S_1$, $S_2$ is the same as in Fig. 1. The alternating voltage between the points A and B after amplification is led to the grid of the tube $V_2$. The grid of $V_3$ is supplied by the connection point of the coils $S_1$, $S_2$ with a constant comparison voltage. The change of the voltage across $S_2$ belonging to the variation of the thickness of the foil is—expressed in per cent—very small compared with the change of the voltage $e$. Therefore the voltage across $S_2$ may be considered practically as constant. A constant comparison voltage may also be supplied directly from the oscillator O to the grid of $V_3$. The calibration is carried out in such a manner that for every foil thickness mutual position of M, $P_1$, $S_1$ is adjusted to give state of equality between voltage $e$ after amplification, and the comparison voltage, fed to grid $V_3$, so that the instrument J carries no current. Also in this example the voltage $e$ is therefore constant for every foil thickness and the calibration independent of the characteristics of the tubes and only dependent on the mutual position of M, $P_1$ and $S_1$.

During the rolling of foils the temperature of the foil is fairly high. Should foils of different temperatures be measured with the same device, then the device must be calibrated for various temperatures, since the electrical conductivity of the metal changes with increasing temperature and thus the readings of the instrument will be affected. It can, however, be so arranged that the influence of the effect of the change of conductivity of the material on the readings can be compensated for. In this case the same calibration holds good for every temperature of the foil. The compensation can, for instance, be attained by having a thermoelement—or several thermoelements connected in series—placed in the vicinity of the foil, so that these thermoelements take the temperature of the foil. In Fig. 5, e. g., the full lines denote copper wires, the dashed lines denote constantan wires. The soldered parts at G are in the vicinity of the foil and take up its temperature, the soldered parts at H are a little further away and take the temperature of the room—which remains almost constantly the same—or another temperature kept constant. Between the points C and D there arises a thermovoltage, which will be distributed through a potentiometer P and which will be led to one of the tubes of the apparatus as supplementary grid bias voltage. Since the percentual sensibility of the apparatus varies with every thickness of foil, a varyingly great part of the voltage C—D for each foil thickness must be tapped off on the potentiometer P. The movement of the contact at the potentiometer can be mechanically connected with the movement of the scale. In the working example according to Fig. 1 a part K—D of the potentiometer P in Fig. 5 would be connected in series with the grid-resistance of tube.

When applied to the example shown in Fig. 4, the tubes $V_2$ and $V_3$ would be connected as biased detectors, i. e., the grid-resistances not to be led on the cathodes but on to a more negative point of the circuit, whereby the part K—D of the potentiometer P in the Fig. 5 must be connected in series to the resistance $R_6$. In the example shown in Fig. 3 the part K—D of the potentiometer P in the Fig. 5 must be connected in between the earth and the half of coil $S_3$ belonging to the tube $V_1$. In this example the connection of a bridging condenser between the points K—D is necessary.

Another solution is to be found by bringing in the vicinity of the foil a wire in which current flows and which alters its resistance with the temperature and which constitutes a part of a potentiometer. A working example of the method is shown in Fig. 6. The resistances $R_1$ and $R_2$ are, e. g., of copper, the resistances $R_3$ and $R_4$ and the potentiometer P of constantan. The resistance $R_1$ is in the vicinity of the foil and takes its temperature, the remaining resistances are brought for instance inside the device and have room-temperature. Should the foil and with it the resistance $R_1$ become warmer, the voltage between Q and T becomes smaller. The voltage between Q and U is not influenced by the temperature. The voltage between Q and W which alters with the temperature variation of the foil is applied as grid bias to one of the tubes of the device. In all the examples shown points Q and W would be connected in the same manner as D and K of the embodiment according to Fig. 5. The movement of the contact of the potentiometer P can be mechanically connected with the movement of the scale.

What I claim as new is:

1. In a device for measuring the thickness of foils or sheet metal the combination of a source of alternating current of two pairs of coils of which the two primary coils are connected to the said source of alternating current and are fed with alternating current and the two secondary coils are connected in series, of the foil or sheet metal to be measured being brought between the primary and secondary coil of the one pair of coils whereby the eddy currents created in the foil alter the amplitude and the phase of the voltage induced in the secondary coil, of a regulating member adapted to regulate the amplitude and the phase of the voltage of the secondary coil of the second pair of coils in such a manner that the voltage in the secondary coil of the second pair of coils becomes approximately opposite in phase to the secondary voltage of the first pair of coils and the amplitude of the voltage in the secondary coil of the second pair of coils becomes as high as it is necessary to keep constant the sum of the two secondary voltages connected in series which sum may also have the value zero, and of an electrical bridge comprising two electron tubes each one working as a rectifier, the anode circuit of each of the said tubes comprising an anode load resistance, a current meter connected between the two anodes of said tubes, the secondary coils being connected to one of said tubes adapted to rectify said sum of the secondary voltages, the other one of said tubes being connected to said source of alternating current adapted to obtain and rectify a constant comparison alternating voltage, the position of said regulating member indicating the thickness of the foil or sheet metal to be measured when the measurement indicates that both of the voltages connected to said rectifier tubes are equal, in which case no current flows through said current meter.

2. In a device for measuring the thickness of foils or sheet metal the combination of a source of alternating current of two pairs of coils of which the two primary coils are connected to the said source of alternating current and are fed with alternating current and the two secondary coils are connected in series, of the foil or sheet metal to be measured being brought between the primary and secondary coil of the one pair of coils whereby the eddy currents created in the foil alter the amplitude and the phase of the voltage induced in the secondary coil, of a regulating member adapted to regulate the amplitude and the phase of the voltage of the secondary coil of the second pair of coils in such a manner that the voltage in the secondary coil of the second pair of coils becomes approximately opposite in phase to the secondary voltage of the first pair of coils and the amplitude of the voltage in the secondary coil of the second pair of coils becomes as high as it is necessary to keep constant the sum of the two secondary voltages connected in series which sum may also have the value zero, of an amplifier connected to the secondary coils adapted to amplify said sum of the secondary voltages, of an electrical bridge comprising two tubes, both working as rectifiers, the anode circuit of each of said rectifier tubes comprising an anode load resistance, a current meter being connected between the two anodes of said rectifier tubes, the amplified sum of said secondary voltages being connected to one of said rectifier tubes, the other one of said rectifier tubes being connected to said source of alternating current adapted to obtain and rectify a constant comparison alternating voltage, the position of said regulating member indicating the thickness of the foil or sheet metal to be measured when the measurement indicates that both of the voltages connected to said rectifier tubes are equal, in which case no current flows through said current meter.

3. In a device according to claim 1, in which said regulating member consists of an arrangement adapted to push in a piece of metal plate which is unequally thick at various places between the two coils of said second pair of coils.

4. In a device according to claim 2, in which said regulating member consists of an arrangement adapted to push in a piece of metal plate which is unequally thick at various places between the two coils of said second pair of coils.

5. In a device according to claim 1, in which the two secondary coils are completed to a resonant circuit by a tuning condenser connected between the two not common ends of the secondary coils.

6. In a device according to claim 2, in which the two secondary coils are completed to a resonant circuit by a tuning condenser connected between the two not common ends of the secondary coils.

LADISLAUS ÜRMÉNYI.